US011683337B2

(12) United States Patent
Killion

(10) Patent No.: US 11,683,337 B2
(45) Date of Patent: Jun. 20, 2023

(54) HARVESTING FULLY QUALIFIED DOMAIN NAMES FROM MALICIOUS DATA PACKETS

(71) Applicant: T-Mobile USA, Inc., Bellevue, WA (US)

(72) Inventor: David Killion, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 237 days.

(21) Appl. No.: 16/898,691

(22) Filed: Jun. 11, 2020

(65) Prior Publication Data
US 2021/0392159 A1 Dec. 16, 2021

(51) Int. Cl.
| H04L 9/40 | (2022.01) |
| G06F 21/56 | (2013.01) |
| G06F 16/955 | (2019.01) |
| H04L 43/50 | (2022.01) |
| H04L 43/04 | (2022.01) |

(52) U.S. Cl.
CPC ........ *H04L 63/1441* (2013.01); *G06F 16/955* (2019.01); *G06F 21/564* (2013.01); *G06F 21/566* (2013.01); *H04L 43/04* (2013.01); *H04L 43/50* (2013.01)

(58) Field of Classification Search
CPC . H04L 63/1441; H04L 43/04; H04L 63/0236; H04L 63/145; H04L 63/1416; G06F 16/955; G06F 21/564; G06F 21/566; H04W 12/088; H04W 12/128
See application file for complete search history.

(56) References Cited

U.S. PATENT DOCUMENTS

| 7,023,861 | B2 | 4/2006 | Makinson et al. | |
| 7,636,944 | B2 | 12/2009 | Raikar | |
| 7,890,612 | B2 | 2/2011 | Todd et al. | |
| 8,555,388 | B1 * | 10/2013 | Wang | H04L 69/22 713/188 |
| 9,027,135 | B1 * | 5/2015 | Aziz | H04L 63/1491 726/23 |
| 9,189,626 | B1 * | 11/2015 | Overfield | H04L 63/0254 |
| 9,405,903 | B1 | 8/2016 | Xie et al. | |
| 9,740,853 | B2 * | 8/2017 | Langton | G06F 21/53 |
| 10,079,846 | B2 | 9/2018 | Yadav et al. | |
| 10,171,490 | B2 | 1/2019 | Ranum et al. | |
| 10,176,325 | B1 * | 1/2019 | Hou | G06F 21/56 |
| 11,316,900 | B1 * | 4/2022 | Schottland | H04L 63/0263 |

(Continued)

FOREIGN PATENT DOCUMENTS

WO WO-2019136953 A1 * 7/2019 ............... G06N 3/02

*Primary Examiner* — Ali S Abyaneh
(74) *Attorney, Agent, or Firm* — Summit Patents PC

(57) ABSTRACT

The system inhibits malware, which has infected user equipment (UE), from establishing a communication channel between to the UE and a malware command and control (C2) website. A malware threat detector detects traffic generated by user equipment generated by malware. The system extracts the logs of these detections and processes the packet capture and extracts the fully qualified domain name (FQDN). The FQDN is then transmitted to a malware information sharing platform and added to the domain name system response policy zone (DNS RPZ). The DNS RPZ can block subsequent access to the malware C2 website due to the inclusion of the FQDN on the DNS RPZ.

17 Claims, 2 Drawing Sheets

(56) References Cited

U.S. PATENT DOCUMENTS

| | | | |
|---|---|---|---|
| 2006/0161983 A1* | 7/2006 | Cothrell | H04L 63/1408 |
| | | | 726/23 |
| 2009/0094691 A1* | 4/2009 | Dargis | H04L 63/0236 |
| | | | 726/11 |
| 2010/0161787 A1* | 6/2010 | Jones | G06F 11/3476 |
| | | | 709/224 |
| 2014/0137254 A1* | 5/2014 | Ou | H04L 63/145 |
| | | | 726/24 |
| 2016/0134658 A1* | 5/2016 | Akiyama | H04L 63/145 |
| | | | 726/23 |
| 2017/0054761 A1* | 2/2017 | Schryver | G06F 16/2379 |
| 2019/0036888 A1* | 1/2019 | Pularikkal | H04L 63/0236 |
| 2020/0067970 A1* | 2/2020 | Compton | H04L 63/1416 |
| 2020/0106806 A1* | 4/2020 | Gupta | G06N 20/00 |
| 2020/0252803 A1* | 8/2020 | Shah | H04L 63/1416 |
| 2020/0314065 A1* | 10/2020 | Roy | H04L 63/30 |

\* cited by examiner

HARVESTING FULLY QUALIFIED DOMAIN NAMES FROM MALICIOUS DATA PACKETS

BACKGROUND

Malicious software, or malware, can affect or disrupt computer processes and can delete, steal, or hold ransom valuable business and personal data. Overall, the average annual cost to organizations has been increasing. For example, in 2018, a single malware attack cost more than $2.6 million. From 2017-2018, ransomware costs rose about 21%, from $533,000 to $646,000 per attack. Over the next few years, cybercrime, including malware attacks, may result in trillions of dollars of losses to individuals and organizations alike.

Furthermore, data security breaches have increased by 11% since 2018 and 67% since 2014. Hundreds of millions of consumers have had their personal information compromised. In 2014, 500 million consumers' information was compromised in a single data breach. In 2013, 3 billion email accounts were compromised in a single data breach.

Malware and data security breaches have historically had and will continue to have in the future serious implications and consequences, including financial, on organizations and consumers. What is needed is a telecommunications network having improved malware and data security.

DETAILED DESCRIPTION

Figure 1:
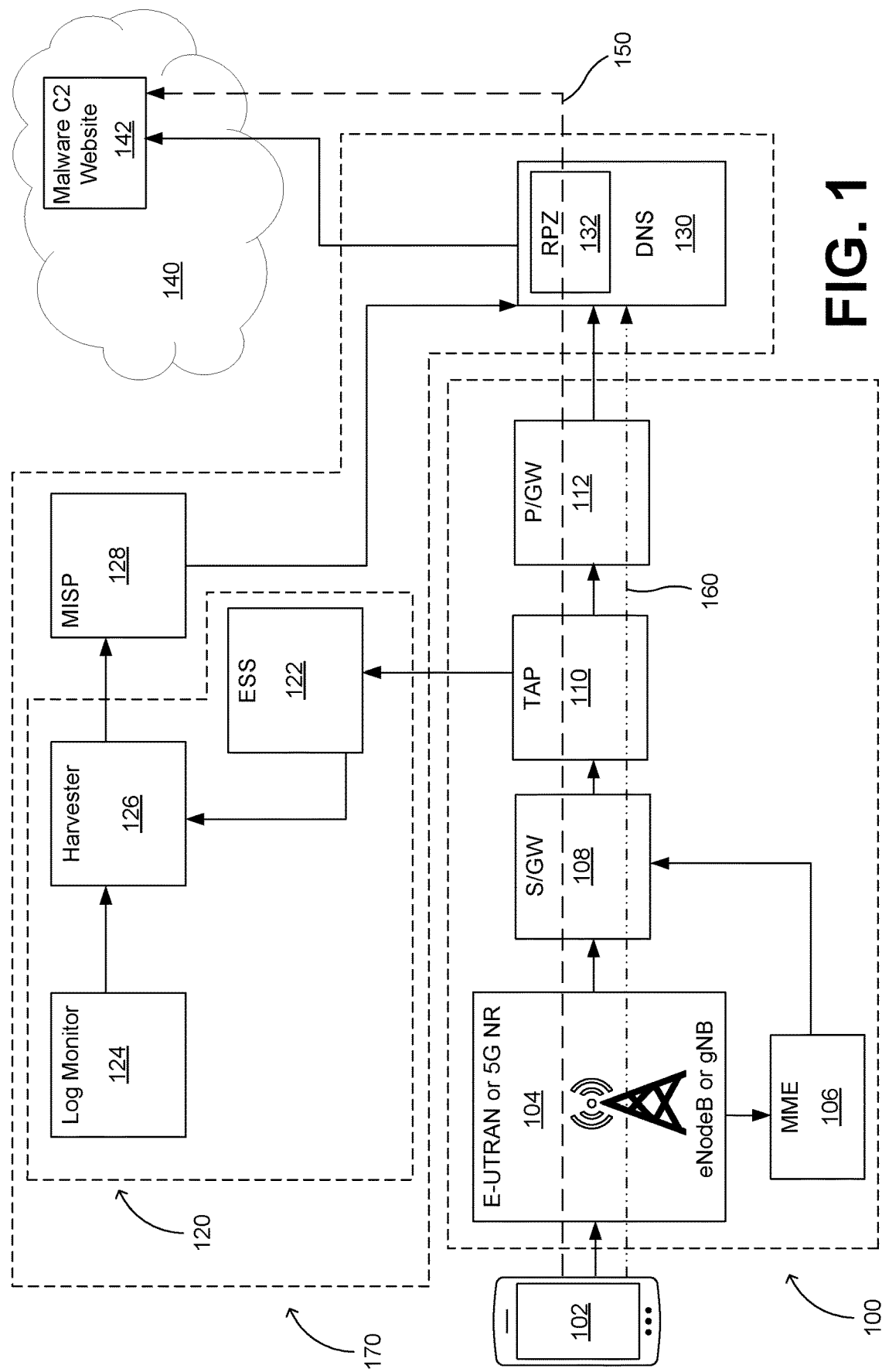
FIG. 1 illustrates an example malicious detection and mitigation system.

Malware is software configured to gain access to a user equipment (UE) or to damage the UE. There are various types of malware, including spyware, ransomware, viruses, worms, Trojan horses, adware, or any type of malicious code that infiltrates the UE without the user's authorization.

One type of malware attack is command and control (C2). In C2, malware infects the UE. The UE, which can sit behind a firewall, can be infected by a phishing email, security holes in a browser or browser plugin, other infected software, or the like. Communication is established between the UE and an attack server. The infected UE then sends a signal to the attack server to obtain one or more instructions. The infected UE carries out the commands sent from the attack server, such as causing the UE to install unauthorized software. The attacker may have complete control of the infected UE and may execute any code, including unauthorized malicious code. The malicious code can spread to other equipment to which the UE is connected, such as by corrupting files on a shared network or by emailing itself to contacts in an address book. This creates a network of infected equipment (i.e., a botnet).

Malware typically uses fully-qualified domain names (FQDNs) for C2. The FQDN is the complete domain name for a specific computer, server, or host on the internet. The FQDN permits the domain name system to resolve the hostname and connect the UE to the desired computer, server, or host. Many attackers use domain name generators (DGAs) to randomly generate potential hosts for C2 to avoid detection of domain name system blacklists. FQDNs require a domain name system (DNS) to resolve to internet protocol (IP) addresses to connect to a malware C2 website or server.

An intrusion detection system and an intrusion prevent system are conventional ways to compare network packets against known cyberthreat databases along a data transmission path. The data transmission path is the path taken by a data packet from the UE to the internet. The data transmission path includes a serving gateway (SGW) in communication with a packet data network gateway (PGW), as discussed below. Each of the systems have their own strengths and weaknesses.

A network intrusion detection system (IDS) monitors a network for malicious activity or policy violations. The strength of the IDS is that it is not in-line with the SGW-PGW connection, rather being an off-shoot from the SGW-PGW connection. This reduces or eliminates dropped data connections, such as by the UE, by avoiding false positives in real time. The weakness of the IDS, however, is inadequate for malware prevention, since the IDS is "listen-only" and does not take any action to ensure network security.

A network intrusion prevention system (IPS) is an IDS in-line with SGW-PGW connection. The strength of the IPS is real-time data packet analysis. The weakness of IPS is dropped data connections (e.g., dropped calls), such as from false positives from IPS signatures, system capacity exhaustion failures, or the like.

A DNS is not considered "in-line" for sessions (i.e., communications between the UE and a computer, host, or server associated with a FQDN in which one or more data packets are transmitted between the UE and computer, host, or server). The DNS ensures appropriate network usage and connections by resolution (or not resolving, where appropriate). DNS resolution is the process of translating or mapping IP addresses to domain names. DNS servers support a resource policy zone (RPZ) that includes a list of domains that the DNS should not resolve when receiving a request to connect to or to communicate with the domain. The RPZ prevents DNS resolution, such as to avoid connection of the UE with the requested computer, host, or server. However, DNS RPZ can only block known FQDNs or domains having been input therein.

A network having enhanced or improved security to detect and prevent malware command and control (C2) connections or communications is described herein. The network includes a telecommunications network to transmit data between a user equipment and the internet, such as a website or server on or in communication with the internet. The network also includes a harvesting system to extract a fully qualified domain name (FQDN) from a data packet that triggers an alert of malicious activity via an intrusion detection system (IDS). The FQDN is validated to ensure that the FQDN is associated with a malware C2 website or server and that blocking communication or connection with the website or server is proper. The FQDN is then added to a domain name system response policy zone (DNS RPZ) to deny resolution when it receives a request to connect to the web site or server from any UE.

As the UE infected with malware attempts to connect to or communicate with the malware C2 website, the DNS RPZ does not resolve the connection or communication. Additionally, the DNA RPZ does not resolve the connection or communication by another UE which has been subsequently infected by malware being spread throughout a computer network or by a UE which is independently infected but uses the same DNS, including the DNS RPZ, to resolve IP addresses. Instead, the DNS RPZ prevents the malware from looking up, and connecting to, IP addresses associated with C2 FQDNs. The UE does not connect to or communicate with the malware C2 website, thereby providing enhanced security and reducing, mitigating, or eliminating further infection or damage.

FIG. 1 shows a malware detection and mitigation system 170 and a telecommunications network 100. The telecommunications network 100 includes an access network (e.g., E-UTRAN; VoLTE; 5G NR; VoNR) 104 which includes a network site (e.g., eNodeB or gNB). The access network 104 transmits data, including data packets, between user equipment (UE) 102 and the internet 140, such as through a data core. The network site of the access network 104 controls the radio related functions between the UE 102 within a given cell of the telecommunications network 100 and the data core of the telecommunications network 100. For example, the network site sends radio transmissions to the UE 102 and receives radio transmissions from the UE 102 using analogue and digital signal processing functions of an access network air interface. The network site also controls low-level operations of the UE 102 via signaling messages, such as handover commands.

The network site includes a UE communication module programmed to communicate (i.e., transmit a signal or data) with the UE 102. The UE communication module can be an interface, such as a UU or e-Uu interface. The network site also includes a data core communication module 144 programmed to communicate (i.e., transmit a signal or data) with the data core. The data core communication module can be an interface, such as a S1, GTP, or NG interface.

The UE 102 is any device used by an end-user for communication or data transmission purposes, including, without limitation, a mobile phone, a smartphone, a tablet, a personal digital assistant, a laptop with mobile connectivity, or the like.

The data core is an IP-based core network infrastructure that provides packet data services, such as to support the convergence of licensed and unlicensed radio technologies (e.g., an evolved packet core (EPC) or 5G Core). The data core can be defined around various paradigms, including mobility, policy management, and security. The four elements of the data core of the telecommunications network 100 include a mobility management entity (MME) 106, a serving gateway (SGW) 108, and a packet data network gateway (PGW) 112. The data core communicates (e.g., sends traffic) with a domain name server (DNS) via the PGW, such as via a SGi interface.

The telecommunications network 100 also includes a network test access point (network TAP) 110. The network TAP 110 is a device that mirrors or copies data passing between network nodes, such as the SGW 108 and the PGW 112. In one example, the network TAP 100 can be in-line, such as being in communication with both the SGW 108 and the PGW 112, via one or more interfaces, including without limitation, an S5 or S8 interface. In another example, the network TAP 110 can be an off-shoot (i.e., branches off from, rather than in-line with) of the SGW-PGW connection.

The network TAP 110 transmits the mirrored or copied data to an endpoint security sensor (ESS) 122 of a FQDN harvester system 120. The ESS 122, such as a NetGuard Endpoint Security, is a signature-based malware threat detector, which inspects UE traffic between the SGW 108 and the PGW 112. Alternatively, or in addition to, the ESS 122 can use behavioral-based malware threat detection (i.e., evaluating an object, such as a data packet, based on the intended actions, including actions which are abnormal, unauthorized, or suspicious).

The ESS 122 is not in-line with the data transmission path. Rather, it receives the mirrored or copied data from the network TAP 110. Accordingly, the ESS 122 does not block data traffic. The ESS 122 detects traffic generated by malware installed on the UE 102 and any devices tethered to the UE 102 (i.e., using the UE 102 as a gateway to transmit or transfer data). In one example, the ESS 122 can correlate general radio packet services tunneling protocol (GTP) IP addresses to the International Mobile Equipment Identity/ International Mobile Subscriber Identity (IMEI/IMSI) that was provisioned for that tunnel (i.e., connection of one network to another network for communication).

IMEI is a unique number assigned to every UE 102 or data card. The IMEI is a 15 digit number programmed into the UE 102, such as by UE manufacturer. IMEI is associated with the UE 102 for the entire life of the UE 102 and must not be modified. Only the UE manufacturer is allowed to assign this number.

IMSI is a unique number assigned to the SIM card used by the mobile subscriber. IMSI can be a 15-digit number that identifies the mobile user within the mobile network. However, to ensure confidentiality of the mobile user, the network uses a temporary number known as TMSI (Temporary Mobile Subscriber Identity) during most of the communication with the mobile phone.

In signature-based malware threat detection, all objects (e.g., data packets) have attributes that can be used to create a unique signature. The objects can be scanned to determine each respective digital signature. The ESS 122 can identify an object as malicious based on the signature, such on a bit or byte level. In one example, the signature can be compared against signatures on a database of known malware. These databases can contain hundreds of millions of signatures that identify malicious objects.

In behavior-based malware detection, an object (e.g., data packet) is evaluated based on the intended actions before the object can actually execute that behavior. An object's intended actions can be analyzed by the ESS 122 for suspicious activities. Attempts to perform actions that are clearly abnormal or unauthorized would indicate the object is malicious, or at least suspicious. Some examples of malicious behavior include any attempt to discover a sandbox environment, disabling security controls, installing rootkits, and registering for autostart.

Referring back to FIG. 1, the FQDN harvester system 120 includes a harvester 126. The harvester 126 fetches a log of a malware signature detected by the ESS 122. The log includes a uniform resource locator (URL) to the packet capture of the data packet that triggered the malware signature. The packet capture is extracted from the ESS 122 and placed into a queue for processing. The harvester 126 processes the packet capture queue and extracts an FQDN from data traffic, such as a hypertext transfer protocol (HTTP) traffic. To reduce or eliminate duplicate FQDNs, malicious FQDNs are checked against the current malicious FQDN list. A malicious FQDN is a FQDN associated with a C2 website, computer, host, server, or the like. When the malicious FQDN is on the list, the FQDN is not added. When the malicious FQDN is not on the list, the FQDN is added. Furthermore, a whitelist keeps trusted, safe FQDN's from being processed as malicious. The malicious FQDNs are saved to a database.

The FQDN harvester system 120 also includes a log monitor 124. The log monitor 124 can index and search log files of system. The log monitor 124 can capture, index, and correlate real-time data. An example log monitor is Splunk®.

The malware detection and mitigation system 170 includes a malware information-sharing platform (MISP)

128, which is software that facilitates the exchange and sharing of threat intelligence (i.e., knowledge about existing or potential cyberthreats), including Indicators of Compromise (IoCs) about targeted malware and attacks. An IoC is a piece of forensic data that identifies potentially malicious activity on a system or network. MISP sharing is a distributed model containing technical and non-technical information, which can be shared in a closed, semi-private or open manner. The distributed model is a platform or model by which information or data is shared between users, systems, or organizations. The MISP 128 can allow for faster detection of targeted attacks and improved detection, while also reducing the number of false positives. The MISP 128 includes a list of malicious FQDNs.

The malware detection and mitigation system 170 also includes a domain name system (DNS) 130 including a response policy zone (RPZ) 132. The DNS 130 resolves IP addresses to connect to a malware C2 website 142 or server over the internet 140. The RPZ 132 is a filtering mechanism that includes a list of domains which should that should not be resolved by the DNS 130 when the DNS 130 receives a request to connect to or to communicate with a domain. However, the RPZ 132 can only block known FQDNs or previously-added domains.

Dashed line 150 of FIG. 1 illustrates a connection to the malware C2 website or server 142 when a malicious FQDN is not included in the RPZ 132. The malware on the UE 102 sends a request to the DNS 130 to connect to the malware C2 website or server 142. The DNS 130 resolves the request, thereby permitting the UE 102 to connect to the malware C2 website or server 142.

The malware detection and mitigation system 170 can also include a user interface to review flagged data packets, update signatures, add sources to a source list (e.g., manually, automatically, or both), the like, or combinations or multiples thereof.

Generally, ESS signatures use URL-pattern matching to determine if an HTTP request is from malware. HTTP requests commonly use the host headers to tell the webserver which website to which the HTTP request is asking to connect. An HTTP request is a message sent by a client to a server that indicates a desired action. The HTTP request can include a host header. The host headers can be FQDNs. The harvest system 120 includes a database of ESS signatures that look for malware URLs (i.e., URLs which include a malicious FQDN), though more specifically mobile malware URLs (i.e., URLs which include a malicious FQDN that is directed to a mobile device). A first module runs at a pre-determined interval (e.g., every minute, 5 minutes, 15 minutes, 30 minutes, 60 minutes, 120 minutes, or the like) to extract logs of the log monitor 124. A log includes the URL for the packet capture of the packet that triggered the signature. The first module also extracts the packet capture from the ESS 122 and puts the packet in queue for processing, such as on a storage device (e.g., a hard drive, a solid state drive, a flash drive, a cloud, a server, the like, or combinations or multiples thereof).

A second module processes the packet capture queue, extracts FQDNs from the HTTP traffic, and de-duplicates the FQDNs to reduce the size of a malicious FQDN table update. "Last Seen" data for each record is also retained to aid in calculating malware frequency, host frequency, or the like. "Last Seen" is the most recent data available, whether new or duplicated.

Malicious FQDNs can be saved to a database, such as a blacklist. A whitelist can optionally be generated to ensure that non-malicious FQDNs are not processed as malicious.

Figure 2:
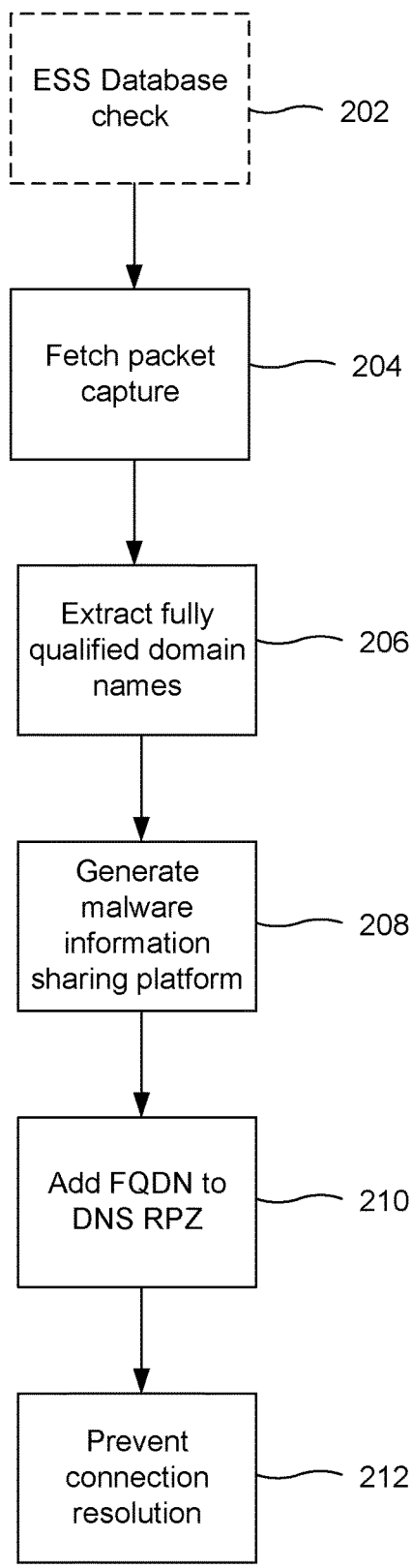
FIG. 2 illustrates a flowchart for an example harvesting process.

FIG. 2 shows a flowchart for a harvesting process, including harvesting by the harvester 126. For purposes of discussion, a flagged data packet is one that has been identified as potentially malicious, such as the data packet signature. The flagged data packet can be confirmed to be malicious or not malicious once subsequent analysis is performed, such as analysis on the packet capture.

At 202, optionally, an operator can log into or a network can determine whether or not a source or other information associated with a flagged data packet is stored in an ESS database. When the source or associated information is not stored in the ESS database, the source, associated information, or both can be added to the ESS database, such as by being stored or added to a list.

The harvester 126 includes two modules: a fetch module and a harvest module. At 204, a packet capture is fetched. To fetch the packet capture, the fetch module retrieves a source of the flagged data packet from a source table, such as in a harvesting database, such as by requesting or looking for the requisite information or data. The fetch module then acquires a log for the source from the log monitor 124. Each log includes a URL to the packet capture of the packet that triggered the signature. The fetch module then retrieves a packet capture a via the respective URL, such as from the ESS 122, for the log. The fetch module then stores the packet captures on a storage device, such as a hard drive, a solid state drive, a flash drive, a cloud, a server, the like, or combinations or multiples thereof.

At 206, the harvest module transmits a request of the packet capture information to the storage device. The harvest module then acquires source metadata for the packet capture and extracts host information from the packet capture. The host information can include the FQDN. The harvest module can duplicate FQDNs by checking malicious FQDNs against the current malicious FQDN list. If the malicious FQDN is on the list, the FQDN is not added. If the malicious FQDN is not on the list, the FQDN is added. The malicious FQDNs are saved to a host table (i.e., a table including IP addresses associated with hostnames), such as in the harvesting database.

Furthermore, a whitelist keeps trusted, safe FQDN's from being processed as malicious. The FQDNs can be manually added to the whitelist by a user to include a trusted, safe FQDN to avoid having the FQDN flagged as malicious during analysis, such as by the ESS 122. The FQDNs can be automatically added to the whitelist by analyzing the data packet, such as with the ESS 122, and determining that the data packet is not malicious. The whitelist can stop further analysis of a data packet which was flagged by the ESS 122 as malicious, by permitting the DNS 120 to resolve the request, or both.

At 208, the MISP 128 is generated, such as by a MISP module. Alternatively, information to include on an already-existing MISP 128 is sent to the already-existing MISP. Source metadata for FQDNs having an "export" identifier is acquired. The FQDNs with the "export" identifier are read from the host table. Source metadata of the FQDN (or hostname, where appropriate) read from the host table is acquired from the associations table, which is a table that matches or compares the information of a FQDN (or hostname, where appropriate) listed in the source table with the information of the same FQDN (or hostname, where appropriate) in the host table. The FQDNs and associated information are compiled, formatted, and pushed out for review, confirmation, acceptance, or the like for addition to the MISP 128.

At 210, the FQDN is added to the DNS RPZ. At 212, the DNS RPZ prevents resolution of a connection or communication with the domain associated with the FQDN associated with malware C2 website or server when a request to connect to the FQDN listed in or added to the DNS RPZ is received.

Referring back to FIG. 1, dot-dot-dashed line 160 illustrates an inhibited connection to the malware C2 website or server 142 when a malicious FQDN is included in the RPZ 132. To inhibit or prevent a connection of the UE 102 to the malware C2 web site or server 142, the DNS RPZ can prevent a communication channel from being established, redirecting the UE 102 to a different website or server, block access to DNS information, the like, or combinations or multiples thereof. The malware on the UE 102 sends a request to the DNS 130 to establish a communication channel with the malware C2 website or server 142. The DNS 130 does not resolve the request, thereby preventing the UE 102 from connecting to and communicating with the malware C2 website or server 142.

The malware detection and mitigation system 170 prevents future connections of infected UEs with the C2 website or server associated with the malicious FQDN. Future connections are prevented by previously recognizing the malicious FQDN, such as through packet capture and analysis, and adding the malicious FQDN to the DNS RPZ, subsequent requests to connect to the malware C2 website or server.

Though the malware detection and mitigation system and method are discussed in relation to a telecommunications network, the malware detection and mitigation system and method can be implemented on an internet service provider, such as for WiFi or other wireless network.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a telecommunications network, those elements, aspects, components or the like can be including with any other telecommunications network, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A malware detection system, comprising:
a network test access point (TAP) configured to mirror or copy data passing between telecommunication network nodes;
a microprocessor configured to:
operate an endpoint security sensor configured to inspect the data mirrored or copied by the network TAP and to detect a malicious data packet associated with a command and control (C2) website, wherein
the detection is based on i) signature-based malware detection and ii) behavior-based malware detection,
the malicious data packet is a mirror or copy of a data packet, the data packet is not blocked until after the detection of the malicious data packet,
the signature-based malware detection includes identifying the malicious data packet as malicious based on attributes that form a unique signature for the malicious data packet, and
the behavior-based malware detection includes evaluating the malicious data packet for one or more intended actions, the evaluating being performed without executing the one or more intended actions,
retrieve a fully qualified domain name (FQDN) associated with the malicious data packet, and
cause the FQDN to be added to a website blacklist; and
an output configured to output an instruction to prevent a user equipment (UE) from establishing a communication channel with the C2 website.

2. The system of claim 1, further comprising the UE, and wherein the instruction prevents the UE from establishing the communication channel with the C2 website via a wireless network.

3. The system of claim 1, wherein the web site blacklist is stored or located within a Domain Name Server Response Policy Zone (DNS RPZ).

4. The system of claim 3, wherein the DNS RPZ prevents DNS resolution of the FQDN associated with the C2 website.

5. The system of claim 1, wherein the instruction prevents the UE from connecting to the C2 website by blocking UE connection to the C2 website, ignoring a UE request to connect to the C2 website, redirecting the UE to an approved website, or combinations thereof.

6. The system of claim 1, wherein the telecommunication network nodes are a serving gateway (SGW) and a packet data network gateway (PGW).

7. The system of claim 1, wherein the endpoint security sensor is configured to compare the unique signature for the malicious data packet against a database of known malware signatures.

8. The system of claim 1, wherein the endpoint security sensor is further configured to identify the malicious data packet as malicious based on the unique signature on a bit or byte level.

9. The system of claim 1, wherein the microprocessor is further configured to:
   extract a log file generated by the detection of the malicious data packet, and
   retrieve a packet capture via a uniform resource locator (URL) of the log file.

10. The system of claim 9, wherein the microprocessor is further configured to store the packet capture on a storage device.

11. The system of claim 10, wherein the microprocessor is further configured to extract the FQDN.

12. The system of claim 9, wherein the microprocessor is further configured to process a packet capture queue on a storage device.

13. The system of claim 9, wherein the microprocessor is further configured to deduplicate FQDNs by checking malicious FQDNs against a current malicious FQDN list and removing any duplicate malicious FQDNs from a currently detected FQDN list while retaining the malicious FQDNs on the current malicious FQDN list.

14. The system of claim 1, wherein the microprocessor is further configured to cause a trusted FQDN to be added to a whitelist to prevent the trusted FQDN from being processed as malicious.

15. The system of claim 1, wherein the FQDN is retrieved by extracting the FQDN from a header of the malicious data packet.

16. The system of claim 1, wherein the FQDN is retrieved by extracting the FQDN from the malicious data packet.

17. The system of claim 1, wherein the FQDN is retrieved by extracting the FQDN from a log generated when the malicious data packet is detected.

* * * * *